(12) United States Patent
Bremner

(10) Patent No.: US 12,247,572 B2
(45) Date of Patent: Mar. 11, 2025

(54) COOLING ARRANGEMENT FOR ELECTRIC MACHINES

(71) Applicant: DEERE & COMPANY, Moline, IL (US)

(72) Inventor: Ronald D. Bremner, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 80 days.

(21) Appl. No.: 18/337,524

(22) Filed: Jun. 20, 2023

(65) Prior Publication Data

US 2023/0332610 A1 Oct. 19, 2023

Related U.S. Application Data

(62) Division of application No. 17/647,512, filed on Jan. 10, 2022, now Pat. No. 11,873,826.

(Continued)

(51) Int. Cl.
| | |
|---|---|
| *F04D 25/16* | (2006.01) |
| *F04D 25/08* | (2006.01) |
| *F04D 29/053* | (2006.01) |
| *F04D 29/58* | (2006.01) |
| *H02K 5/128* | (2006.01) |
| *H02K 9/06* | (2006.01) |

(52) U.S. Cl.
CPC ......... *F04D 25/166* (2013.01); *F04D 25/082* (2013.01); *F04D 29/053* (2013.01); *F04D 29/5806* (2013.01); *F04D 29/584* (2013.01); *H02K 5/128* (2013.01); *H02K 9/06* (2013.01); *B60Y 2200/221* (2013.01)

(58) Field of Classification Search
CPC .. H02K 9/04; H02K 9/06; F04D 25/02; F04D 29/5806
See application file for complete search history.

(56) References Cited

U.S. PATENT DOCUMENTS

| | | |
|---|---|---|
| 2,153,386 A | 4/1939 | Morey |
| 3,670,190 A | 6/1972 | Goebel |

(Continued)

FOREIGN PATENT DOCUMENTS

| | | |
|---|---|---|
| EP | 1215418 A1 | 6/2002 |
| EP | 1727263 A2 | 11/2006 |

(Continued)

OTHER PUBLICATIONS

German Search Report issued in application No. DE102022201633.5, dated Dec. 2, 2022, 10 pages.

*Primary Examiner* — Kenneth J Hansen

(57) ABSTRACT

An electric machine for a work vehicle including a housing, a stator assembly positioned inside the housing, and a rotor assembly rotatably connected to the housing via a bearing. The rotor assembly is positioned to form an air gap between the stator assembly and the rotor assembly. A front air dam is positioned at a first end of the housing and adjacent to the air gap. The front air dam includes an external barrier, an internal barrier, an opening in the internal barrier, and a passageway in the internal barrier. A fan is attached to the rotor assembly and positioned within the housing. The fan generates a first air flow towards the air gap and a second air flow through the passageway.

7 Claims, 16 Drawing Sheets

Related U.S. Application Data

(60) Provisional application No. 63/154,150, filed on Feb. 26, 2021.

(56) References Cited

U.S. PATENT DOCUMENTS

| | | | |
|---|---|---|---|
| 4,274,021 A | 6/1981 | Kamiya et al. | |
| 4,513,213 A | 4/1985 | Tomiyama | |
| 4,600,848 A | 7/1986 | Sutrina et al. | |
| 5,214,325 A * | 5/1993 | Matson | H02K 9/06 310/58 |
| 5,283,488 A | 2/1994 | Ponnappan et al. | |
| 7,160,086 B2 | 1/2007 | Maceyka et al. | |
| 7,466,053 B1 | 12/2008 | Radev | |
| 7,538,457 B2 | 5/2009 | Holmes et al. | |
| 7,705,503 B2 | 4/2010 | Takahashi et al. | |
| 7,797,815 B2 | 9/2010 | Bremner | |
| 7,911,091 B2 | 3/2011 | Takenaka et al. | |
| 8,129,874 B2 | 3/2012 | Lambka et al. | |
| 8,378,550 B2 | 2/2013 | Bradfield | |
| 8,896,167 B2 | 11/2014 | Mckinzie et al. | |
| 9,246,369 B2 | 1/2016 | Tamai et al. | |
| 9,397,536 B2 | 7/2016 | Cimatti | |
| 10,069,380 B2 | 9/2018 | Gugel et al. | |
| 10,243,419 B2 | 3/2019 | Gugel et al. | |
| 2002/0037225 A1 | 3/2002 | Choi | |
| 2002/0180284 A1 | 12/2002 | LeFlem et al. | |
| 2004/0146411 A1 | 7/2004 | Maceyka | |
| 2007/0065317 A1 | 3/2007 | Stock | |
| 2009/0146513 A1 | 6/2009 | Bremner | |
| 2012/0104884 A1 * | 5/2012 | Wagner | H02K 1/32 310/54 |
| 2012/0299403 A1 | 11/2012 | Stahlhut et al. | |
| 2013/0119796 A1 * | 5/2013 | Maeda | H02K 9/06 310/63 |
| 2015/0207386 A1 | 7/2015 | Garrard et al. | |
| 2015/0276282 A1 | 10/2015 | Heiden et al. | |
| 2017/0126099 A1 | 5/2017 | Chou | |
| 2020/0149622 A1 | 5/2020 | Kuhl et al. | |
| 2021/0062900 A1 | 3/2021 | Ore et al. | |
| 2021/0170857 A1 | 6/2021 | Worley et al. | |
| 2021/0249929 A1 | 8/2021 | Bremner | |
| 2021/0249935 A1 | 8/2021 | Long et al. | |
| 2021/0309099 A1 | 10/2021 | Long | |
| 2021/0339309 A1 | 11/2021 | Bremner | |

FOREIGN PATENT DOCUMENTS

| | | |
|---|---|---|
| EP | 1928680 B1 | 2/2009 |
| EP | 2601730 B1 | 7/2014 |
| EP | 2800251 A1 | 11/2014 |
| EP | 3193434 A1 | 7/2017 |
| GB | 276654 A | 9/1928 |
| GB | 320563 A | 10/1929 |
| GB | 546735 A | 7/1942 |
| JP | H0192048 A | 4/1989 |
| WO | WO 9524762 A1 | 9/1995 |
| WO | WO 2005099070 A1 | 10/2005 |
| WO | WO 2010055757 A1 | 5/2010 |
| WO | WO 2015036876 A1 | 3/2015 |
| WO | WO 2015040510 A1 | 3/2015 |
| WO | WO 2018098567 A1 | 6/2018 |
| WO | WO 2021034808 A1 | 2/2021 |

* cited by examiner

COOLING ARRANGEMENT FOR ELECTRIC MACHINES

CROSS-REFERENCE TO RELATED APPLICATIONS

This is a divisional application of U.S. patent application Ser. No. 17/647,512, filed Jan. 10, 2022, which claims the benefit of U.S. provisional patent application No. 63/154,150, filed Feb. 26, 2021, which are hereby incorporated by reference.

FIELD OF THE DISCLOSURE

The present disclosure relates to electric machine cooling systems or arrangements.

BACKGROUND

Electric machines can generate heat during operation. Excessive heat can adversely affect the performance or even damage components of electric machines. Electric machines require effective thermal management to operate at higher efficiencies.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a cooling system or arrangement of one or more electric machines used in a transmission of a work vehicle.

According to an aspect of the present disclosure, an electric machine for a work vehicle, includes a housing, a stator assembly positioned inside the housing, and a rotor assembly rotatably connected to the housing via a bearing. The rotor assembly is positioned to form an air gap between the stator assembly and the rotor assembly. A front air dam is positioned at a first end of the housing and adjacent to the air gap. The front air dam includes an external barrier, an internal barrier, an opening in the internal barrier, and a passageway in the internal barrier. A fan is attached to the rotor assembly and positioned within the housing. The fan generates a first air flow towards the air gap and a second air flow through the passageway.

According to an aspect of the present disclosure, the external barrier and the internal barrier of the front air dam form an interior, and the fan is positioned within the interior.

According to an aspect of the present disclosure, the opening in the front air dam is positioned within a middle portion of the internal barrier of the front air dam, and the passageway of the front air dam is positioned between the opening in the front air dam and the external barrier of the front air dam.

According to an aspect of the present disclosure, a front shield includes an opening arranged coaxially with the opening of the front air dam.

According to an aspect of the present disclosure, a rear air dam is positioned at a second end of the housing, the rear air dam includes an opening, and the rear air dam is adjacent to the air gap.

According to an aspect of the present disclosure, a rear shield includes an opening arranged coaxially with the opening of the rear air dam.

According to an aspect of the present disclosure, a valve selectively directs the second air flow within the front air dam.

According to an aspect of the present disclosure, when the rotor assembly rotates, the fan generates an air flow into the housing through the opening in the front air dam, the front air dam directs the first air flow from the fan towards the air gap between the stator and the rotor, and the front air dam directs the second air flow from the fan through the passageway and out of the housing.

According to an aspect of the present disclosure, when the rotor assembly rotates, the fan generates an air flow into the housing through the opening in the rear air dam, which directs the first air flow towards an air gap between the stator and the rotor, and the front air dam directs the second air flow from the passageway towards the fan.

According to an aspect of the present disclosure, a cooling system includes a first electric machine and a second electric machine. The first electric machine includes a first housing, a first stator assembly connected to the first housing, a first rotor assembly rotatably connected to the first housing via a first bearing, a first front air dam positioned at a first end of the first housing, and a first fan attached to the first rotor assembly inside the first housing. The second electric machine includes a second housing, a second stator assembly connected to the second housing, a second rotor assembly rotatably connected to the second housing via a second bearing, a second front air dam positioned at a first end of the second housing, and a second fan attached to the second rotor assembly inside the second housing. A conduit connects a first passageway in the first front air dam to a second passageway in the second front air dam. When the first rotor assembly is rotating at faster speed than the second rotor assembly, the first fan generates a first air flow into the first housing towards a first air gap between the first rotor assembly and the first stator assembly and a second air flow in the conduit.

According to an aspect of the present disclosure, an opening in the front air dam is positioned within a middle portion of an internal barrier of the front air dam, and a passageway of the front air dam is positioned between the opening in the front air dam and an external barrier of the front air dam.

According to an aspect of the present disclosure, the first electric machine includes a first rear air dam positioned at a second end of the housing, and the first rear air dam is adjacent to the air gap.

According to an aspect of the present disclosure, the first electric machine includes a first front shield having an opening arranged coaxially with an opening of the first front air dam, and the first electric machine includes a rear shield having an opening arranged coaxially with an opening of the first rear air dam.

According to an aspect of the present disclosure, a valve selectively directs the air flow between the first electric machine and the second electric machine.

According to an aspect of the present disclosure, when the first rotor assembly is rotating at a faster speed than the second rotor assembly, the first fan generates an air flow into the first housing through an opening in the first front air dam, the first front air dam directs the first air flow from the first fan towards the first air gap, the first front air dam directs the second air flow from the first fan into the conduit, the second front air dam directs the second air flow from the conduit into a second air gap between the second rotor assembly and the second stator assembly.

According to an aspect of the present disclosure, when the first rotor assembly is rotating at faster speed than the second rotor assembly, the first fan generates an air flow into the first housing through an opening in the first rear air dam, the first rear air dam directs the first air flow towards the first air gap, and the first front air dam directs the second air flow from the conduit towards the first fan.

According to an aspect of the present disclosure, a method for cooling a first electric machine and a second electric machine includes one or more of the following: rotating a rotor assembly in the first electric machine at a faster speed than a rotor assembly in the second electric machine; generating an air flow into a housing of the first electric machine via a fan attached to the rotor assembly in the first electric machine; directing a first air flow towards an air gap between the rotor assembly and a stator assembly of the first electric machine; and directing a second air flow through a conduit connecting a first air dam of the first electric machine to a second air dam of the second electric machine.

According to an aspect of the present disclosure, the method includes directing the second air flow from the first electric machine to the second electric machine via the conduit connected to a first passageway in the first air dam and a second passageway in the second air dam.

According to an aspect of the present disclosure, the method includes directing the second air flow from the second electric machine to the first electric machine via a second passageway of the second air dam, the conduit, and a first passageway of the first air dam.

According to an aspect of the present disclosure, the method includes selectively directing the air flow via a valve.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
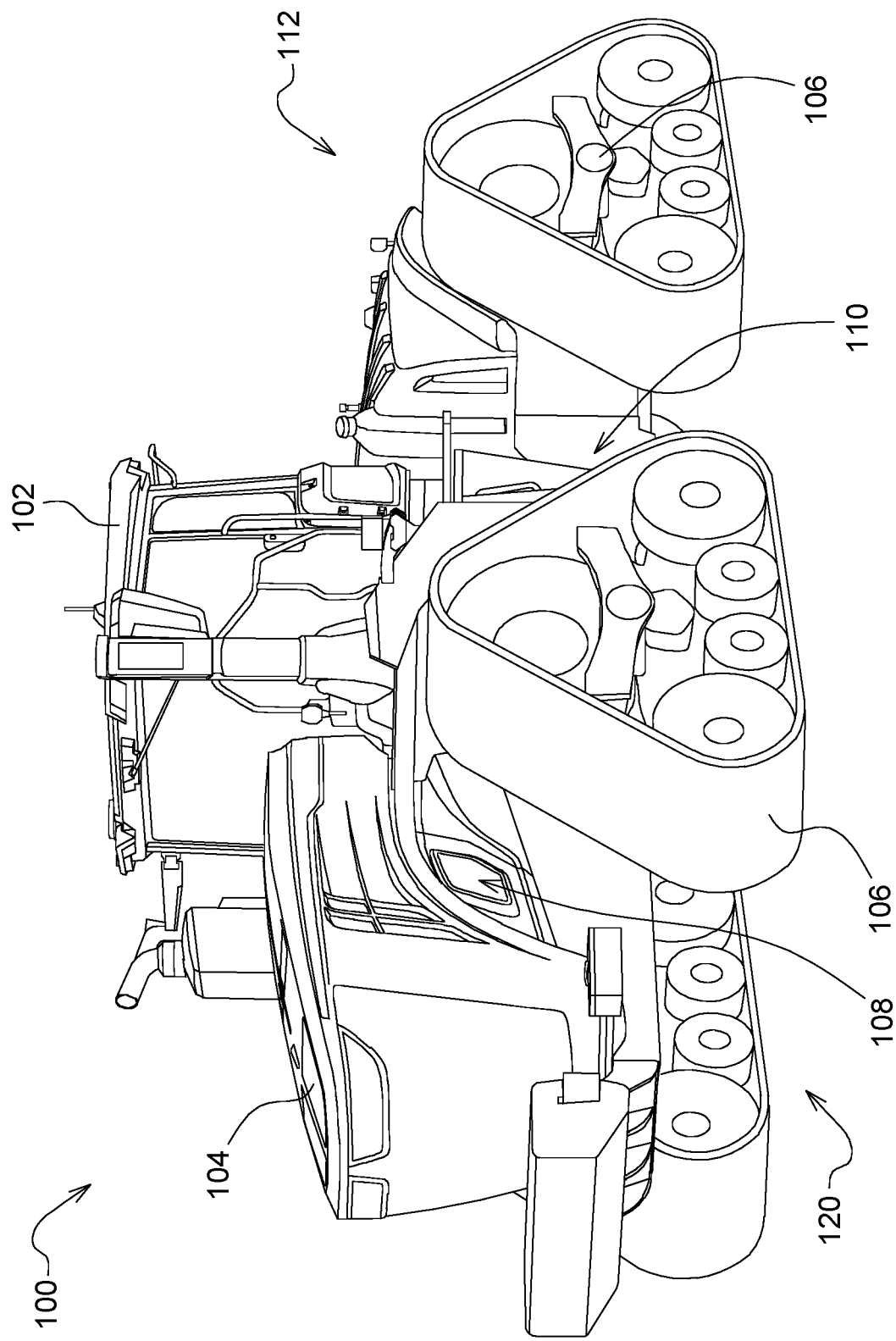
FIG. 1 is a perspective view of a work vehicle, according to an implementation.

The implementations disclosed in the above drawings and the following detailed description are not intended to be exhaustive or to limit the disclosure to these implementations. Rather, there are several variations and modifications which may be made without departing from the scope of the present disclosure.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps, which may be comprised of any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

The references "A" and "B" used with reference numerals herein are merely for clarification when describing multiple implementations of an apparatus.

FIG. 1 illustrates an agricultural work vehicle 100, for example an agricultural tractor. This disclosure also applies to other types of work vehicles in agriculture, construction, forestry, and road building. The agricultural work vehicle 100, hereinafter referred to as a work vehicle 100, can include a frame or chassis 110, an operator station or cab 102, and one or more ground engaging apparatus 106, for example wheels or track assemblies. The work vehicle 100 can have a rigid or an articulated frame 110. The work vehicle 100 can include a power source 108, for example an internal combustion engine, positioned under a covering or hood 104 and a transmission 112 transferring power to the ground engaging apparatus 106, hereinafter referred to as tracks 106, and one or more power take off shafts. The work vehicle 100 can include an operator interface having any number and combination of electronic devices, such as an interactive display.

Figure 2:
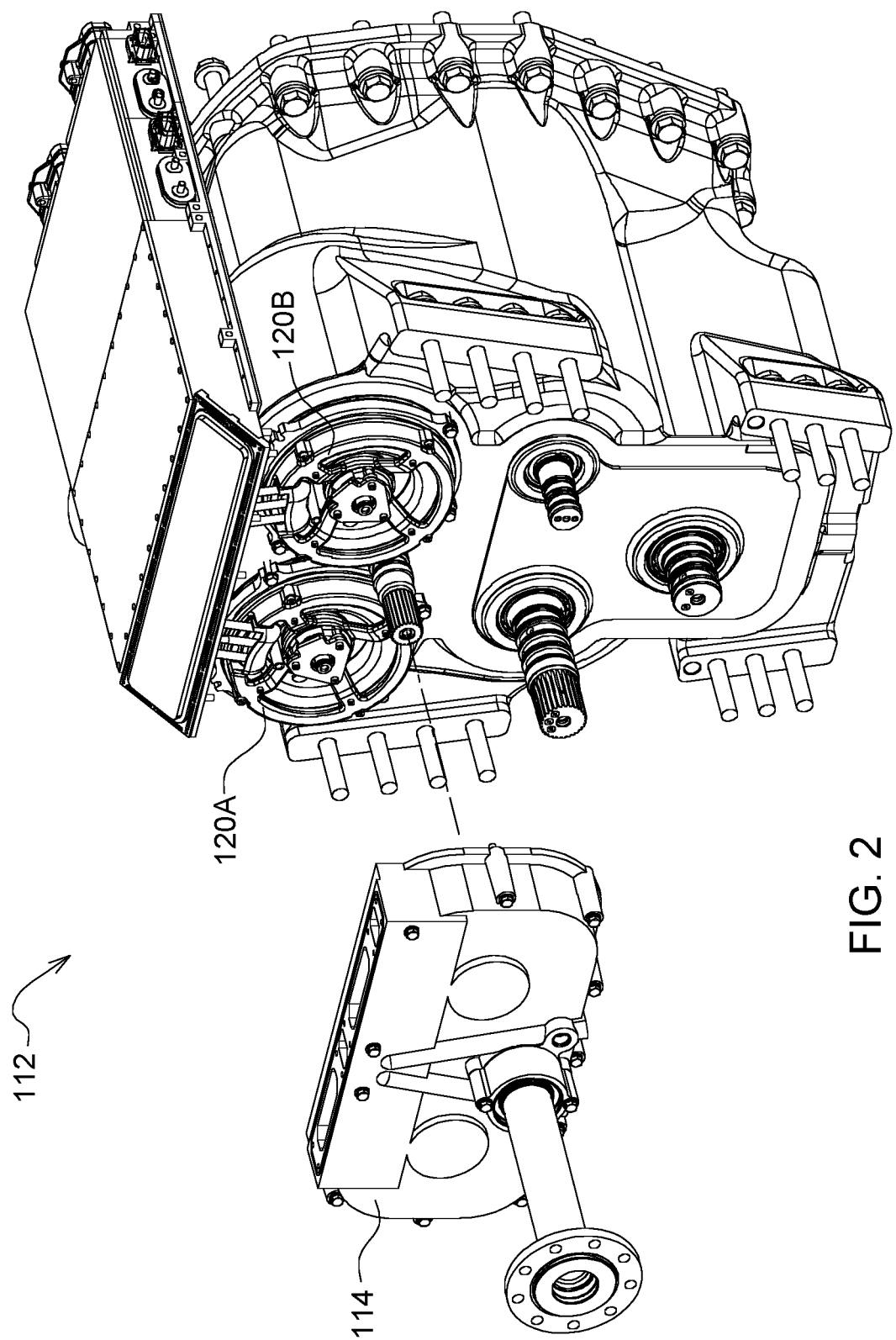
FIG. 2 is a perspective view of a transmission for a work vehicle, according to an implementation.

With reference to FIG. 2, a transmission 112 can include one or more electric machines 120A, 120B, including, but not limited to, electric motors, electric generators, and electric motor-generators. The electric machines 120A, 120B can be any type of AC or DC electric machines. The transmission 112 can include a cover 114 for the electric machines 120A, 120B. The transmission 112 can be an electric infinitely variable transmission (eIVT). According to some implementations, a transmission 112 can include a plurality of electric machines 120A, 120B. A first electric machine 120A can be driven at a fixed or variable ratio to the speed of an internal combustion engine. The first electric machine 120A can be driven in a first direction by the internal combustion engine to generate electricity. A second electric machine 120B can be driven by electrical power in an extensive range of different speeds in either first or second direction. According to some implementations, the second electric machine 120B can operate anywhere between −10,000 and 10,000 rpm. The second electric machine 120B can operate at or near zero speed, 0 rpm, with high torque. The first and second electric machines 120A, 120B can have the same construction, configuration, and capabilities.

Figure 3:
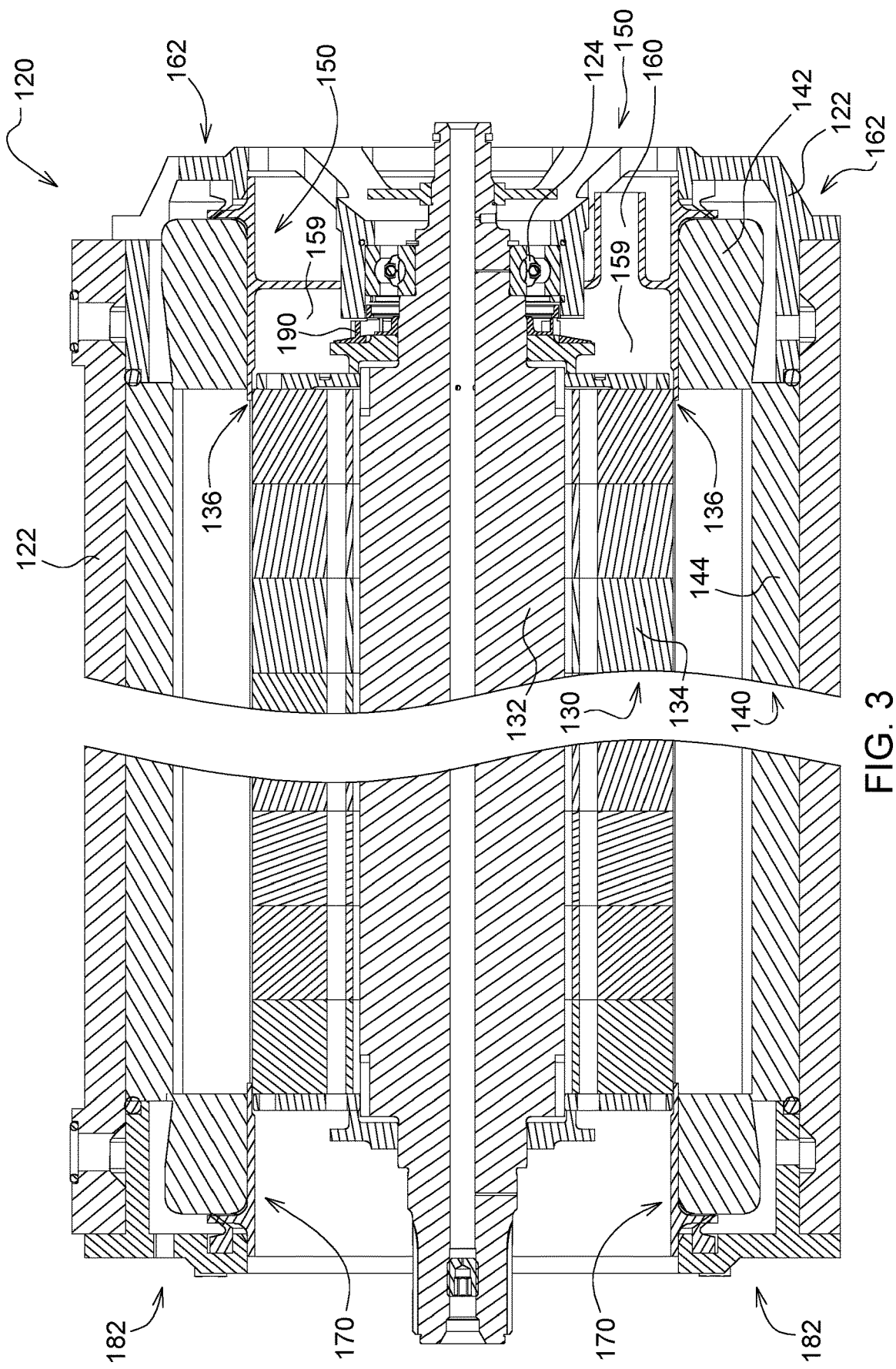
FIG. 3 is a cross-sectional view of an electric machine, according to an implementation.

With reference to FIG. 3, an electric machine 120 may include a housing 122, a rotor assembly 130, a stator assembly 140, a front air dam member 150, a rear air dam member 170, a front shield member 162, a rear shield member 182, and a fan 190. The rotor assembly 130 can include a rotor shaft 132 and a plurality of rotor laminations 134. The electric machine 120 can include a bearing 124 positioned between the rotor shaft 132 and the housing 122. The rotor assembly 130 can include a plurality of magnets, for example permanent magnets. The stator assembly 140 can include stator windings 142 and a plurality of stator laminations 144. The electric machine 120 may include an air gap 136 between the rotor assembly 130 and the stator assembly 140. The air gap 136 extends around at least a portion of the perimeter of the rotor assembly 130. According to some implementations, the air gap 136 extends around the entire perimeter of the rotor assembly 130. The front air dam 150 can be adjacent to the air gap 136 at a first end of the electric machine 120. The rear air dam 170 can be adjacent to the air gap 136 at a second end of the electric machine 120.

The electric machine 120 may operate as a generator, in which the rotor assembly 130 rotates in response to mechanical torque provided to the rotor shaft 132 generating an electrical current (e.g., an AC current) in the stator assembly 140. The electric machine 120 may operate as a motor, in which the rotor assembly 130 rotates in response to an electrical current (e.g., an AC current) provided to the stator assembly 140. The electric machine 120 can generate a large torque when a large current is applied to the stator assembly 140 and the rotor assembly 130 is rotating near zero rpm or is stationary at zero rpm. The electric machine 120 can be any type of AC or DC electric machine (motor, generator, or motor-generator).

Figure 4:
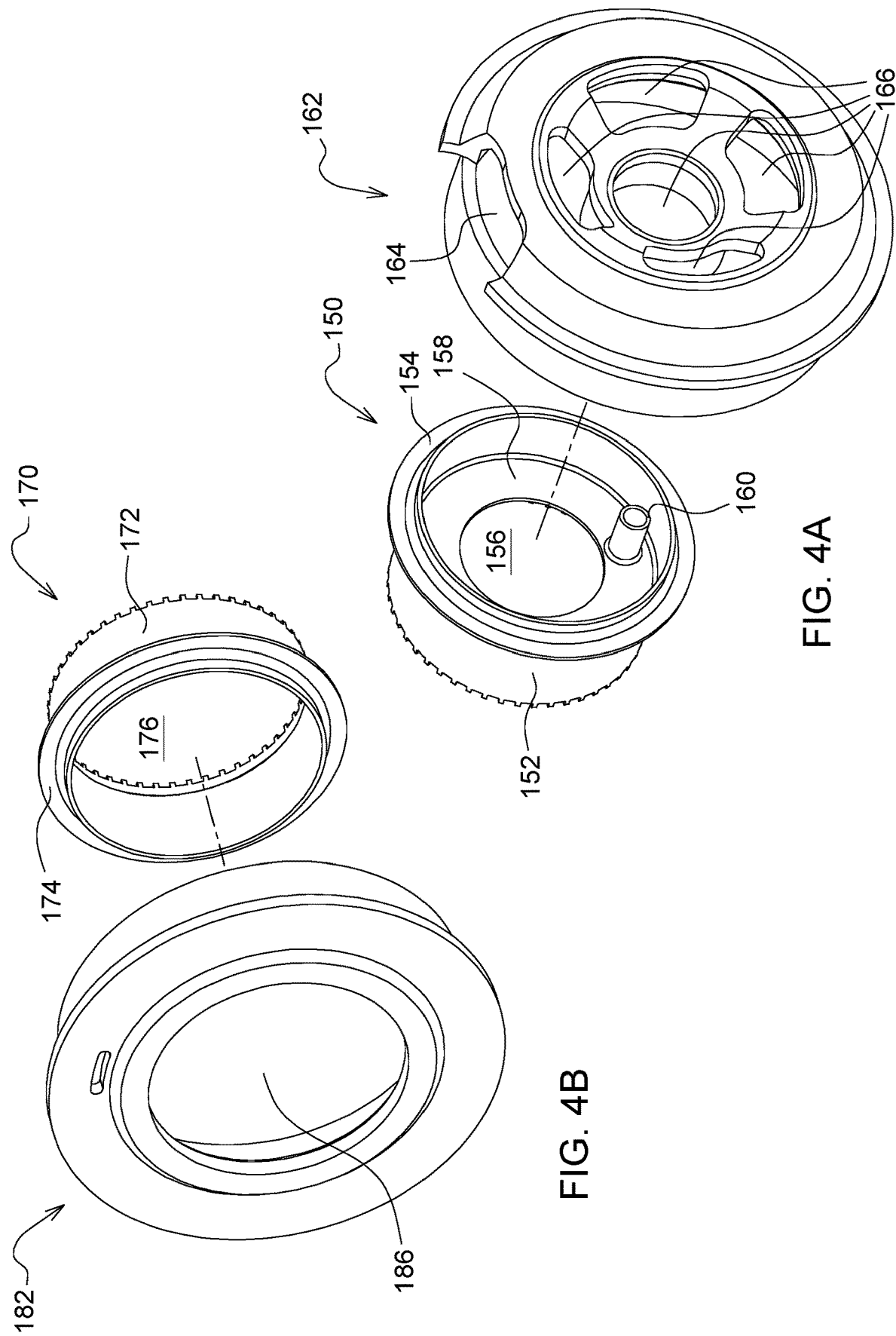
FIG. 4A is a perspective view of a front air dam member and a front shield member for an electric machine, according to an implementation.
FIG. 4B is a perspective view of a rear air dam member and a rear shield member for an electric machine, according to an implementation.

With reference to FIGS. 4A and 4B, a front air dam member 150 can include an external barrier or wall 152, a flange 154, an opening 156, an internal barrier or wall 158, and a passageway 160. The external wall 152 and the internal wall 158 at least partially define or form an interior 159. The fan 190 can be positioned within the interior 159. The opening 156 can be centrally located or positioned within a middle portion of the internal wall 158. The passageway 160 can have any shape or size. The shape and size of the passageway 160 can be determined at least in part on the desired amount of air flow exiting via the passageway 160. The passageway 160 can be sized smaller to reduce the amount of air flow exiting the interior 159 via the passageway 160. The passageway 160 can be sized larger to increase the amount of air flow exiting the interior 159 via the passageway 160. The passageway 160 can be positioned between the opening 156 and the external barrier 152. The passageway 160 can be cylindrical, as shown for example in FIG. 4A.

A front shield member 162 can include a cable passage 164 for electric cables. The front shield member 162 can be separate or integral with the front air dam member 150. The front shield 162 can include one or more openings 166. The front shield 162 can include an opening 166 arranged coaxially with the opening 156 of the front air dam 150 when installed on the electric machine 120. A rear air dam member 170 can include an external barrier or wall 172, a flange 174, and an opening 176. A rear shield member 182 can be separate or integral with the rear air dam 170. The rear shield member 182 can include an opening 186 arranged coaxially with the opening 176 of the rear air dam 170 when installed on the electric machine 120.

Figure 5:
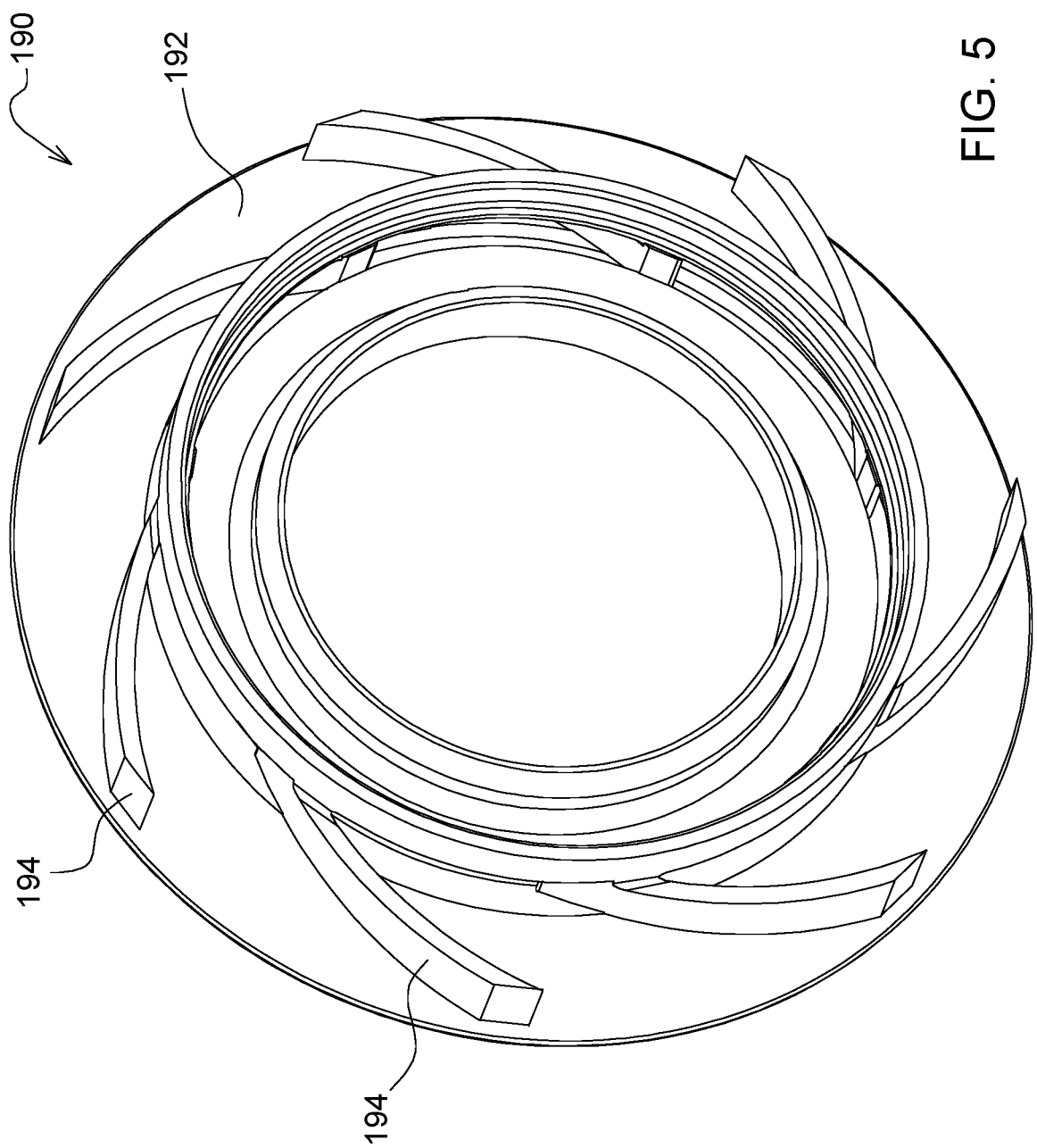
FIG. 5 is a perspective view of a fan for an electric machine, according to an implementation.

With reference to FIG. 5, a fan 190 can include a fan wheel 192 and a plurality of blades or impellers 194. The fan 190 can be connected or attached to the rotor shaft 132 and rotate at the same or different speed as the rotor shaft 132. The fan 190 can be a centrifugal fan or impeller fan. The fan blades or impellers 194 can be straight or curved. The fan 190 can be a backward inclined impeller, as shown.

Figure 6:
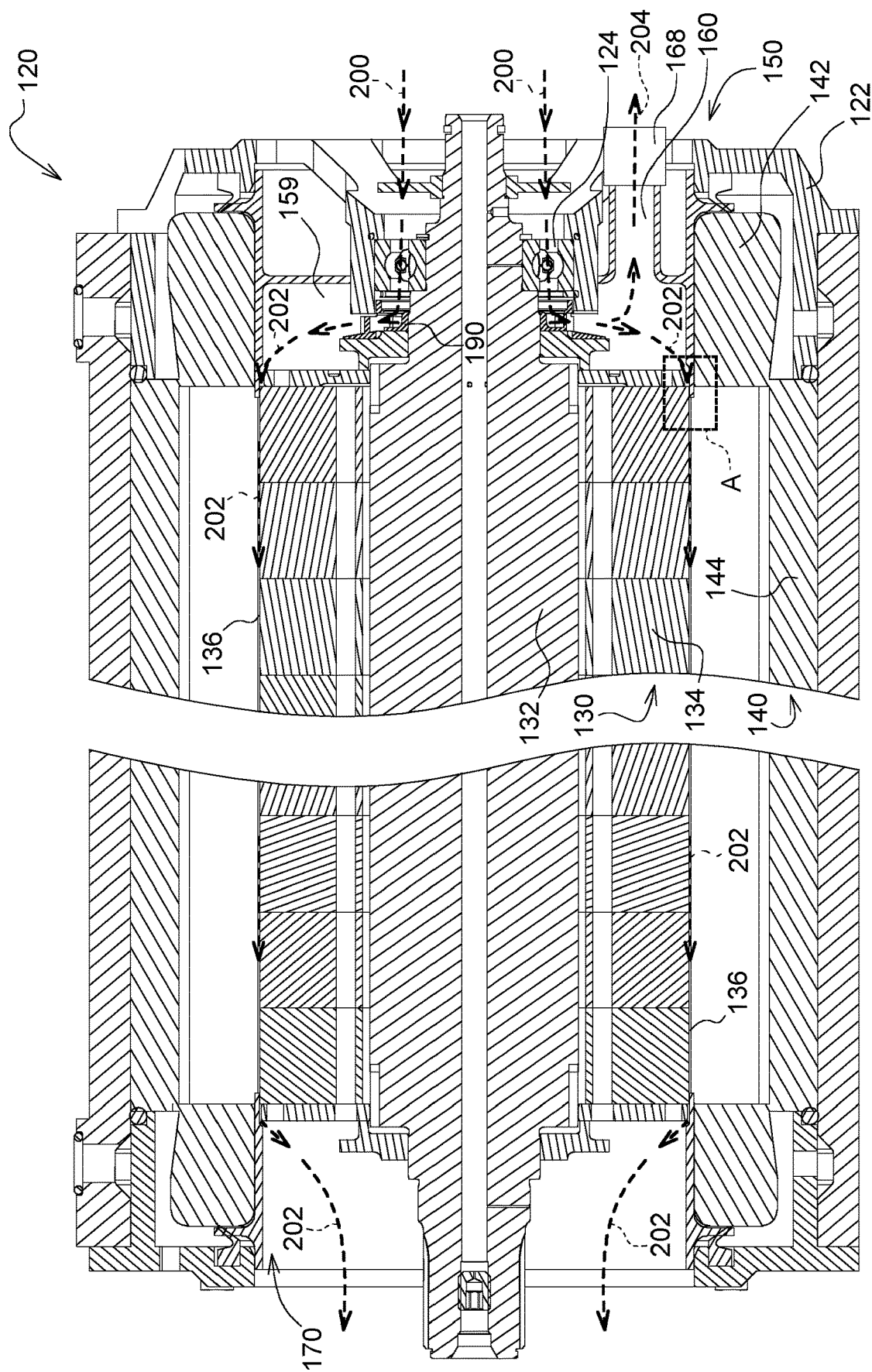
FIG. 6 is a cross-sectional view of an electric machine, according to an implementation.
Figure 7:
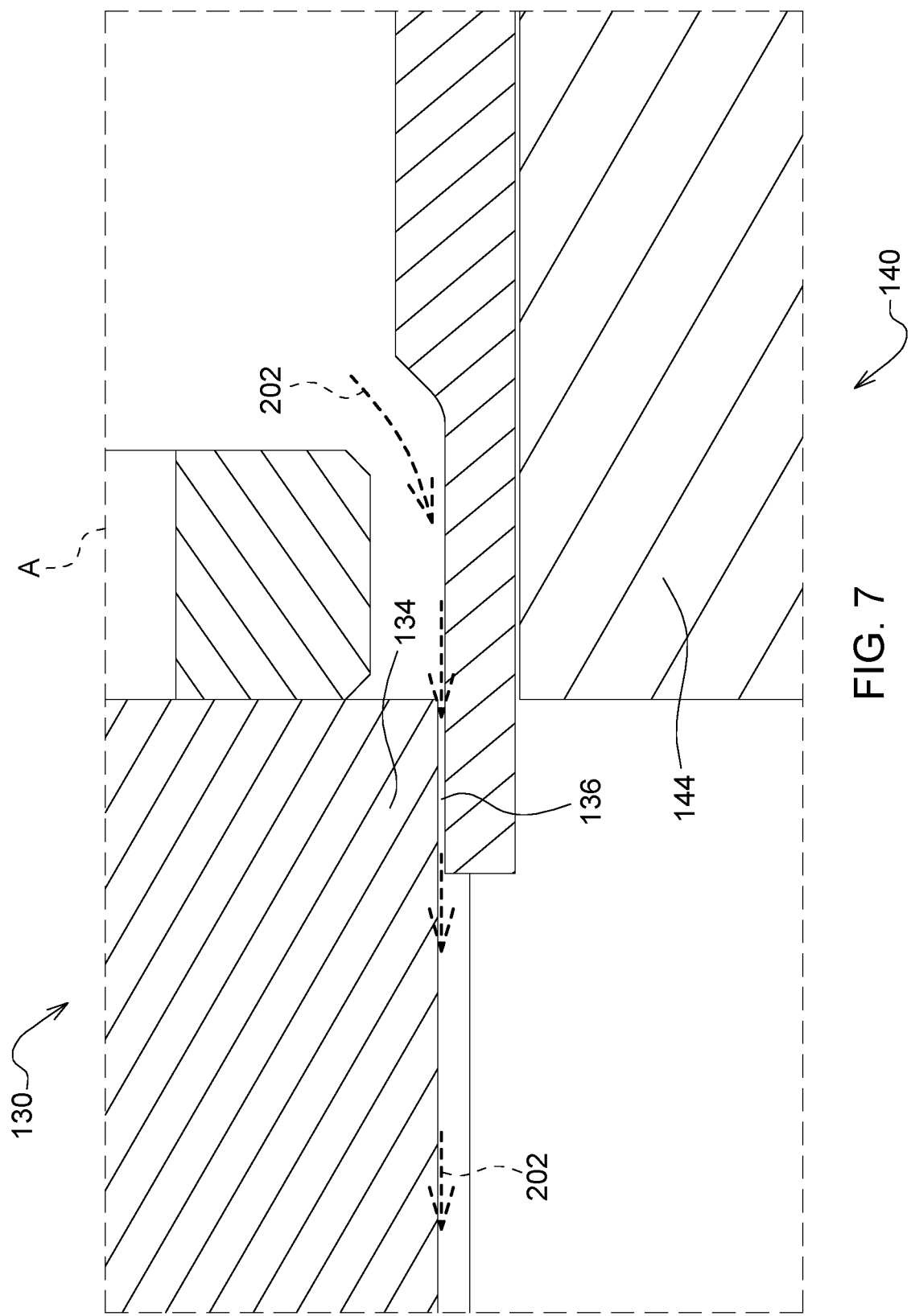
FIG. 7 is an enlarged view of detail A in FIG. 6, according to an implementation.
Figure 8:
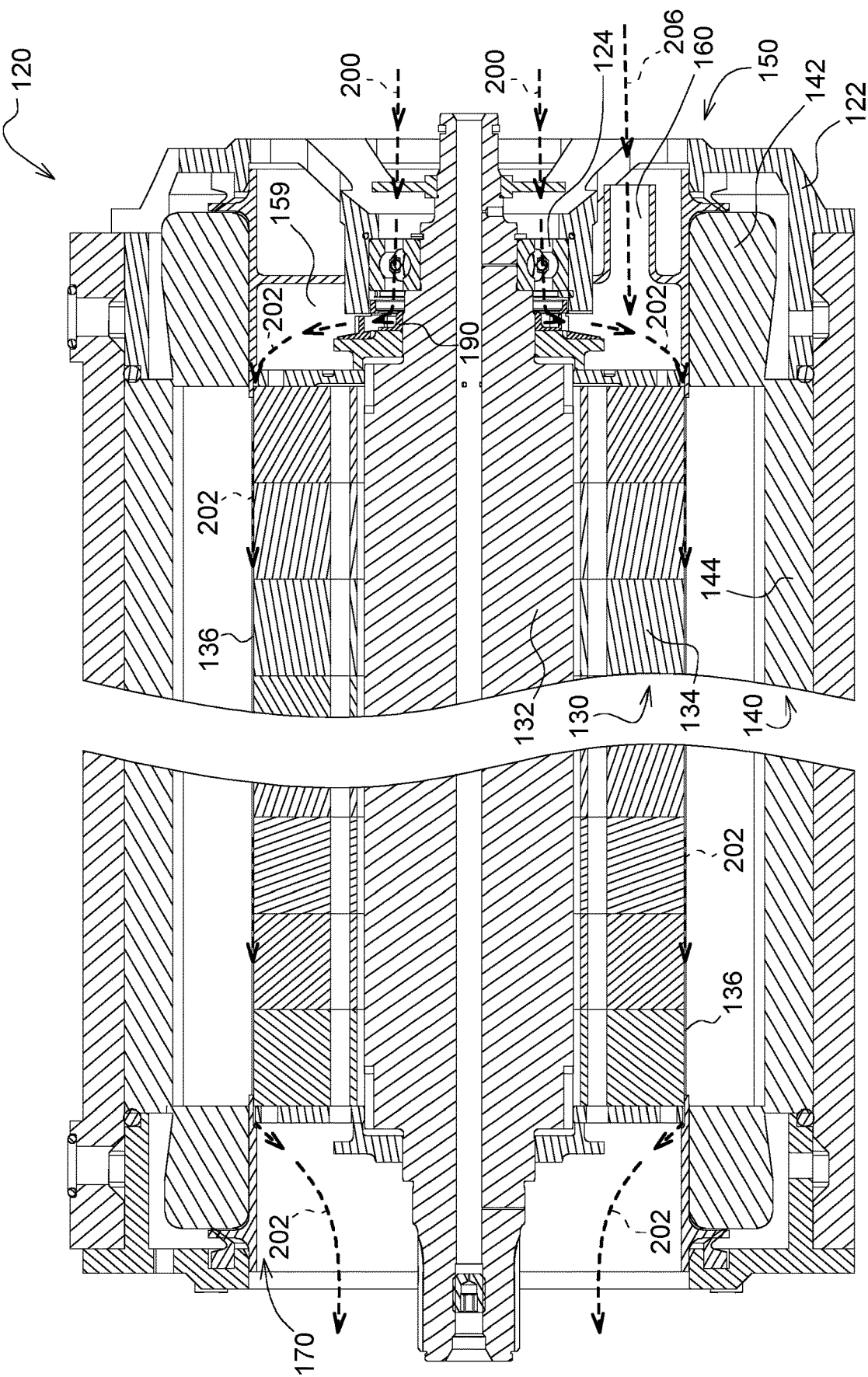
FIG. 8 is a cross-sectional view of an electric machine, according to an implementation.

With reference to FIGS. 6-8, an electric machine 120 includes a fan 190 rotating with the rotor shaft 132, which is driven by a power source of a work vehicle. The fan 190 can be directly or indirectly connected to the rotor shaft 132. The fan 190 can rotate at the same speed as or at a different speed than the rotor shaft 132. The fan 190 can rotate at a specific ratio to the rotor shaft 132. The fan 190 can rotate in the same or opposite direction as the rotor shaft 132. The fan 190 can generate an air flow 200 into the electric machine 120 with an air flow 202 flowing into the air gap 136 and an air flow 204 flowing out through passageway 160 of the front air dam 150. The front air dam 150 or the passageway 160 can include a valve 168, such as a check valve, to prevent or inhibit the air flow 212 from exiting the interior 159 until the pressure within the interior 159 increases above a preselected level. The fan 190 can generate the air flow 200 into the housing 122 of the first electric machine 120A through one or more openings 166 in the front shield member 162, through the bearing 124, and through the opening 156 of the front air dam 150. The opening 156 can define or form an inlet for the air flow 200 into the interior 159 of the front air dam 150. The fan 190 pushes or propels the air flow 200 outward from the perimeter of the fan 190, where an air flow 202 flows toward the air gap 136 and an air flow 204 flows toward the passageway 160 of the front air dam 150, as shown in FIG. 6. The passageway 160 can define or form an outlet for the air flow 204 out of the interior 159 of the front air dam 150.

The front air dam 150 directs the air flow 202 from the fan 190 towards the air gap 136 and the air flow 204 from the fan 190 to the passageway 160. The internal wall 158 and the external wall 152 of the front air dam 150 can direct the air flow 202 from the fan 190 towards the air gap 136 and the air flow 204 from the fan 190 to the passageway 160. The internal wall 158 and the external wall 152 can maintain the air flow 202 within the housing 122 until the air flow 202 enters the air gap 136. The internal wall 158 and the external wall 152 can maintain the air flow 204 within the interior 159 of the front air dam 150 until the air flow 204 enters the passageway 160.

The air flow 202 enters the air gap 136 near a first end of the rotor assembly 130, as shown in FIG. 7. After entering, the air flow 202 continues to move through the air gap 136 along the length of the rotor assembly 130. The air flow 202 absorbs heat from the stator assembly 140, the rotor assembly 130, or both. The air flow 202 exits the air gap 136 near a second end of the rotor assembly 130 and moves out of the housing 122 of the electric machine 120 through the opening 176 in the rear air dam 170, which directs the air flow 202 to exit the electric machine 120. The opening in the rear air dam 170 defines or forms an outlet from the electric machine 120 for the air flow 202, which cools the electric machine 120 by removing heat generated in the rotor assembly 130, the stator assembly 140, and other components.

The air flow 204 exits the housing 122 of the electric machine 120 through the passageway 160 of the front air dam 150. The size and shape of the passageway 160 influences the amount of the air flow 204 exiting the interior 159 of the front air dam 150. The air flow 204 can be used to cool one or more other electric machines 120. For example, when the air flow 202 is sufficient to cool the electric machine 120, the air flow 204 can be used to provide cooling to one or more other electric machines 120. In another example, when the electric machine 120 needs or requires more cooling, additional air flow 206 can be provided from an external source, as shown in FIG. 8. According to some implementations, the external source is another electric machine 120 with a fan 190.

Figure 9:
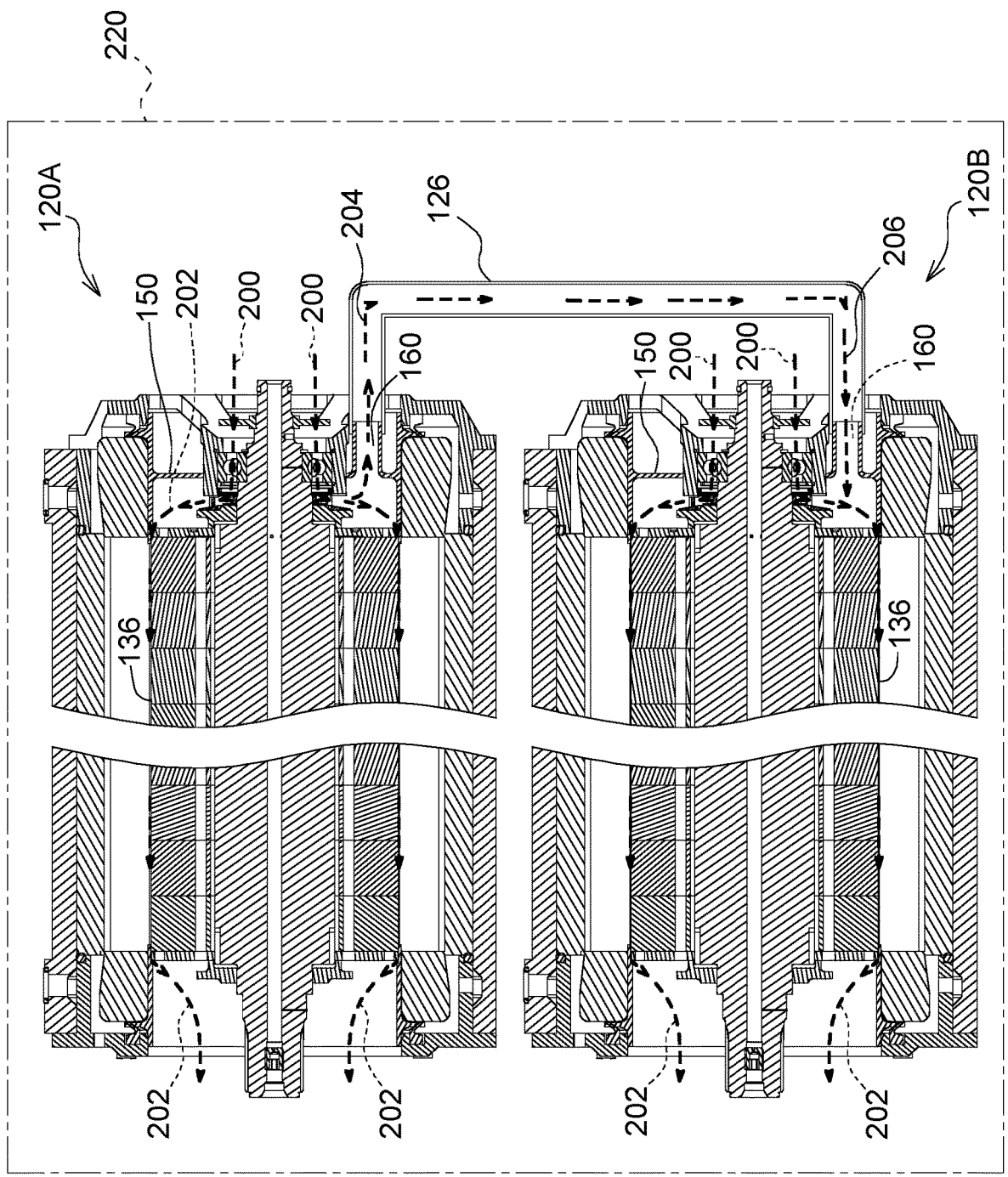
FIG. 9 is a cross-sectional view of a plurality of electric machines in a cooling system or arrangement, according to an implementation.

With reference to FIG. 9, a cooling system or arrangement 220 includes a first electric machine 120A and a second electric machine 120B. A conduit 126 connects the passageway 160 of the front air dam 150 in the first electric machine 120A to the passageway 160 of the front air dam 150 in the second electric machine 120B. In one example, the first electric machine 120A is operating at a higher speed than the second electric machine 120B. The rotor assembly 130 of the first electric machine rotates at a higher rpm than the rotor assembly 130 of the second electric machine 120B. The rotor assembly 130 of the second electric machine 120B could be rotating near zero rpm or could be stationary at zero rpm with a large current in the stator assembly 140 generating a large torque. The large current in the stator assembly 140 generates heat, which needs to be removed. Because the rotor assembly 130 is at or near zero speed, the fan 190 in the second electric machine 120 is producing an inadequate amount of cooling air flow.

The fan 190 in the first electric machine 120A generates an air flow 202 flowing into the air gap 136 and an air flow 204 exiting through the passageway 160, as directed by the front air dam 150. The air flow 202 moves through the air gap 136 removing heat from the stator assembly 140. The air flow 204 flows through conduit 126 away from the first electric machine 120A towards the second electric machine 120B. The air flow 204 exits the conduit 126 as an additional air flow 206, which moves through the passageway 160 into the second electric machine 120B. The additional air flow 206 flows into the air gap 136 of the second electric machine 120B to provide additional cooling. In another example, the second electric machine 120B is operating at a higher speed than the first electric machine 120A. In this example, the air flow 204 reverses direction and flows from the second electric machine 120B to provide the additional air flow 206 to the first electric machine 120A. The cooling system 220 can be used in the transmission 112 or in other components of the work vehicle 100.

Figure 10:
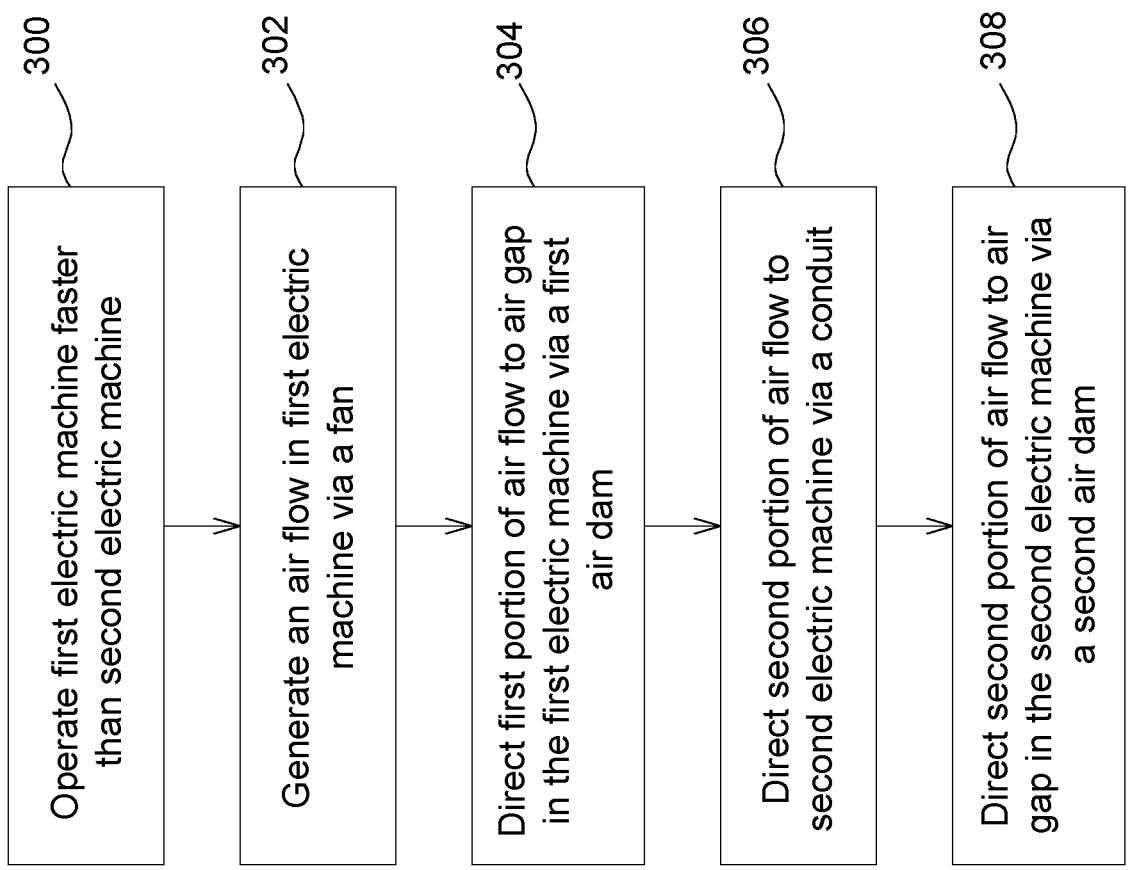
FIG. 10 is a flow diagram for a method of cooling a plurality of electric machines, according to an implementation.

With reference to all the FIG. 10, a method for cooling a first electric machine 120A and a second electric machine 120B can include one or more of the following steps. At step 300, the method can include rotating a rotor assembly in the first electric machine at a faster speed than a rotor assembly in the second electric machine.

At step 302, the method can include generating an air flow within a housing 122 of the first electric machine 120A by rotating a fan 190 attached to a rotor assembly 130. At step 304, the method can include directing an air flow 202 towards a first air gap 136 positioned between the rotor assembly 130 and a stator assembly 140 of the first electric machine 120A via a front air dam 150 of the first electric machine 120A positioned at a first end of the housing 122.

At step 306, the method can include directing an air flow 204 through a passageway 160 of the front air dam 150 out of the housing 122 of the first electric machine 120A and into a conduit 126 via the front air dam 150 of the first electric machine 120A. The method can include directing the air flow 204 through the conduit 126 towards the second electric machine 120B. The method can include directing the air flow 204 from the conduit 126, through a passageway 160 of a front air dam 150 of the second electric machine 150B, and into a housing 122 of the second electric machine 120B via the front air dam 150 of the second electric machine 150B.

At step 308, the method can include directing the air flow 204 into an air gap 136 between a rotor assembly 130 and a stator assembly 140 of the second electric machine 120B via the front air dam 150 of the second electric machine 150B. When the second electric machine 120B is rotating faster than the first electric machine 120A, then the air flow in the conduit 126 is reversed and flows from the second electric machine 120B to the first electric machine 120A. In other implementations, one or more of these steps, processes, or operations may be omitted, repeated, re-ordered, combined, or separated and still achieve the desired results.

Figure 11:
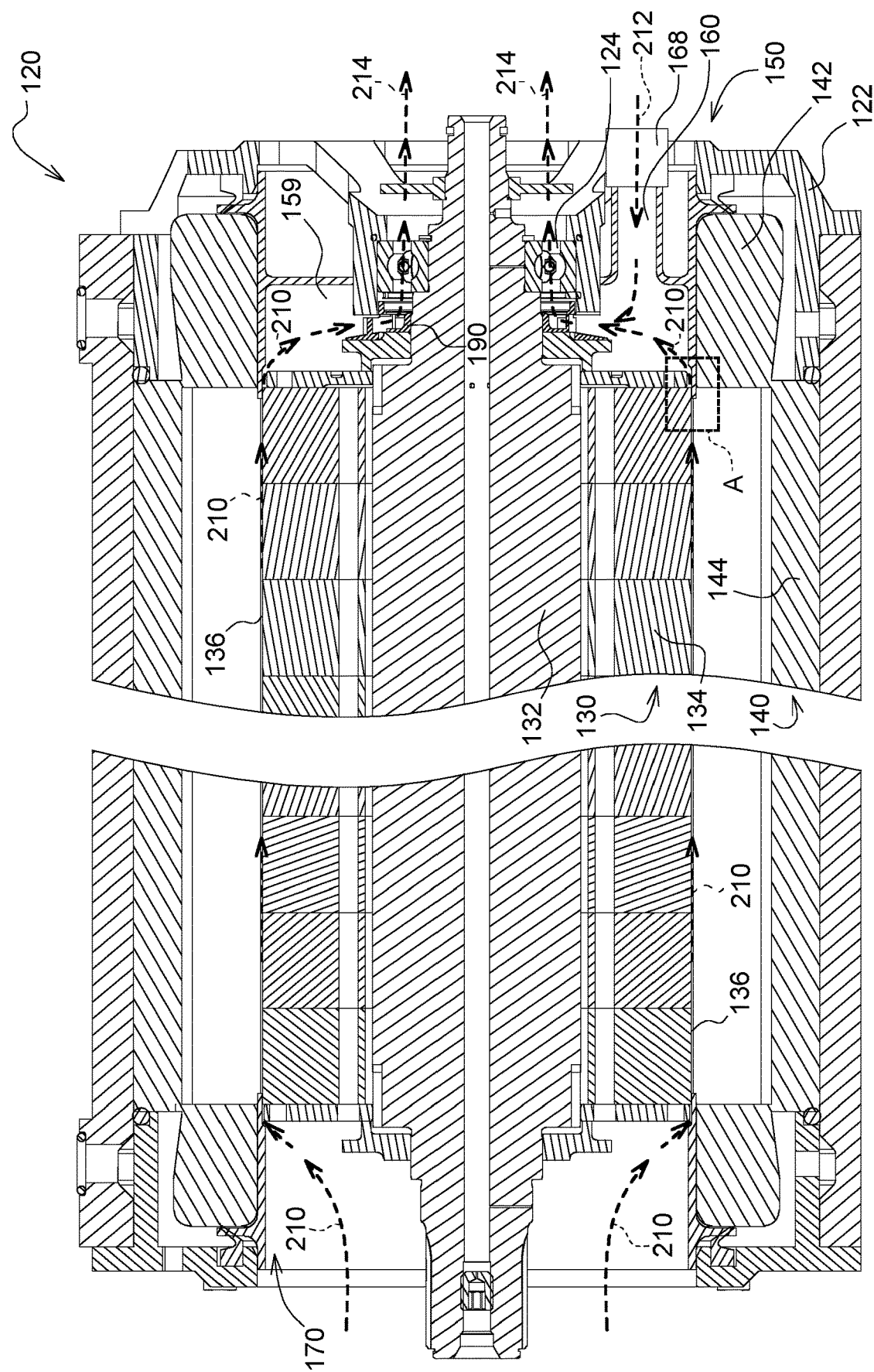
FIG. 11 is a cross-sectional view of an electric machine, according to an implementation.
Figure 12:
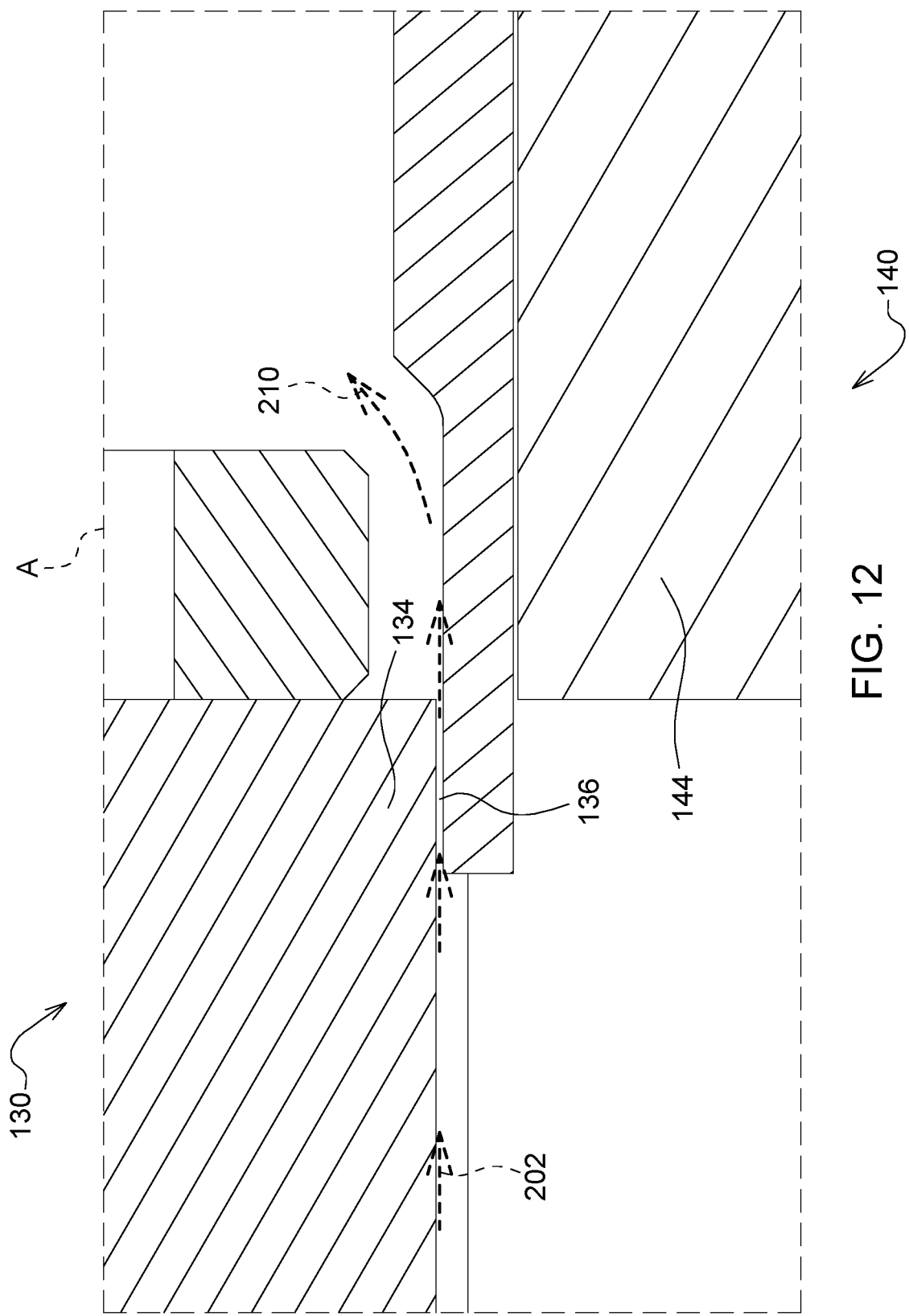
FIG. 12 is an enlarged view of detail A in FIG. 10, according to an implementation.
Figure 13:
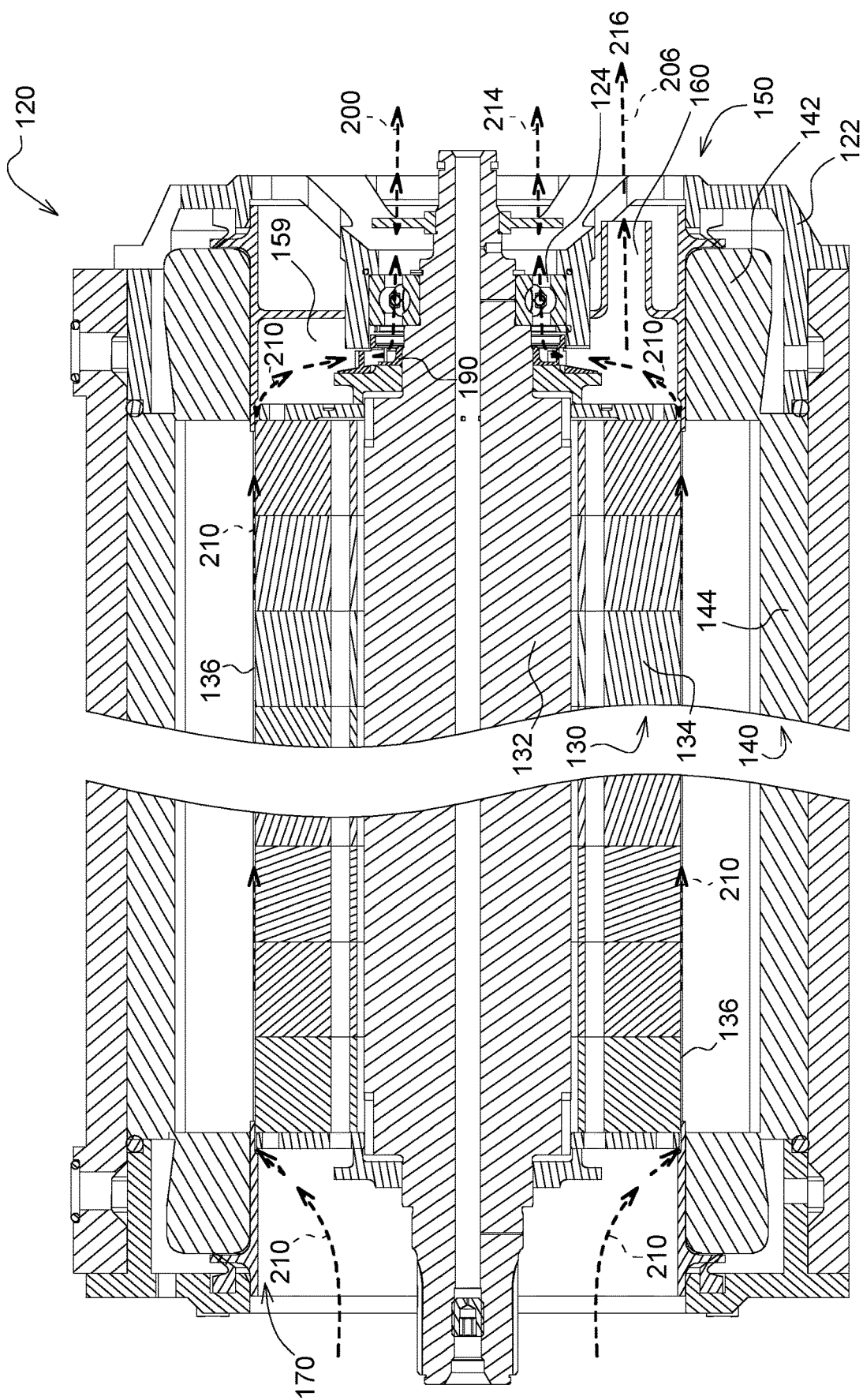
FIG. 13 is a cross-sectional view of an electric machine, according to an implementation.
Figure 14:
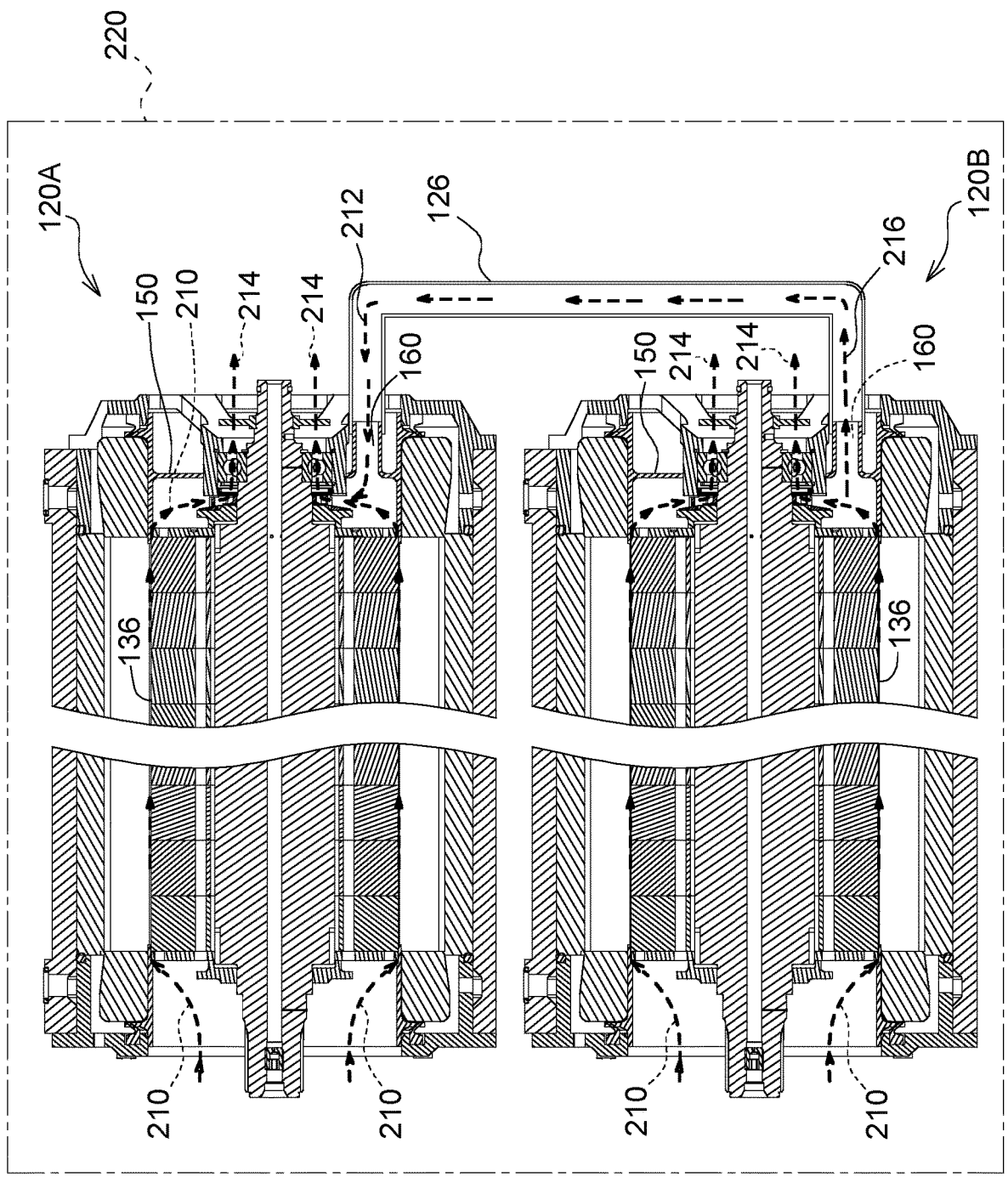
FIG. 14 is a cross-sectional view of a plurality of electric machines in a cooling system or arrangement, according to an implementation.

With reference to FIGS. 11-13, a fan 190 can generate an air flow 210 into the electric machine 120 in an opposite direction as the air flow 200 in FIGS. 6-8. The fan 190 can generate the air flow 210 into the housing 122 of the electric machine 120 through an opening 186 in the rear shield member 182, through the opening 176 of the rear air dam 170, and into the air gap 136 between the rotor assembly 130 and the stator assembly 140. The air flow 210 absorbs heat from the stator assembly 140, the rotor assembly 130, or both. The fan 190 draws or pulls the air flow 210 through the air gap 136 into the interior 159 of the front air dam 150. The fan 190 can also draw or pull an air flow 212 through the passageway 160 of the front air dam 150 into the interior 159 of the front air dam 150, as shown in FIG. 11. The size and shape of the passageway 160 influences the amount of the air flow 212 entering the interior 159 of the front air dam 150 through the passageway 160. The front air dam 150 or the passageway 160 can include a valve 168, such as a check valve, to prevent or inhibit the air flow 212 from entering the interior 159 until the pressure within the interior 159 decreases below a preselected level. The fan 190 pushes or propels the combined air flows 214 out of the interior 159 of the front air dam 150 through the opening 156 of the front air dam 150, through the bearing 124, and through one or more openings 166 in the front shield member 162. The air flow 212 can be used to draw or pull an air flow from one or more other electric machines 120. If the electric machine 120 needs or requires more cooling, additional air flow 215 can be drawn or pulled via an external source, as shown in FIG. 14. According to some implementations, the external source is another electric machine 120 with a fan 190.

Similar to the cooling system or arrangement 220 in FIG. 9, a cooling system or arrangement 220 in FIG. 14 includes a first electric machine 120A connected to a second electric machine 120B via a conduit 126. In some operating conditions, the first electric machine 120A rotates at a higher speed than the second electric machine 120B. The fan 190 in the first electric machine 120A generates an air flow 210 flowing into the air gap 136 and an air flow 212 entering through the passageway 160, as directed by the front air dam 150. The air flow 210 moves through the air gap 136 removing heat from the stator assembly 140. The air flow 212 joins the air flow 210 near the fan 190, and the combined air flow 214 then exits the first electric machine 120A.

The air flow 212 generates an additional air flow 216 out of the second electric machine. The additional air flow 216 draws or pulls additional air from the air gap 136 of the second electric machine 120B to provide additional cooling. In other operating conditions, the second electric machine 120B rotates at a higher speed than the first electric machine 120A. In these conditions, an air flow 212 flows into the second electric machine 120B, which generates the additional air flow 216 out of the first electric machine 120A and provides additional cooling for the first electric machine 120A.

Figure 15:
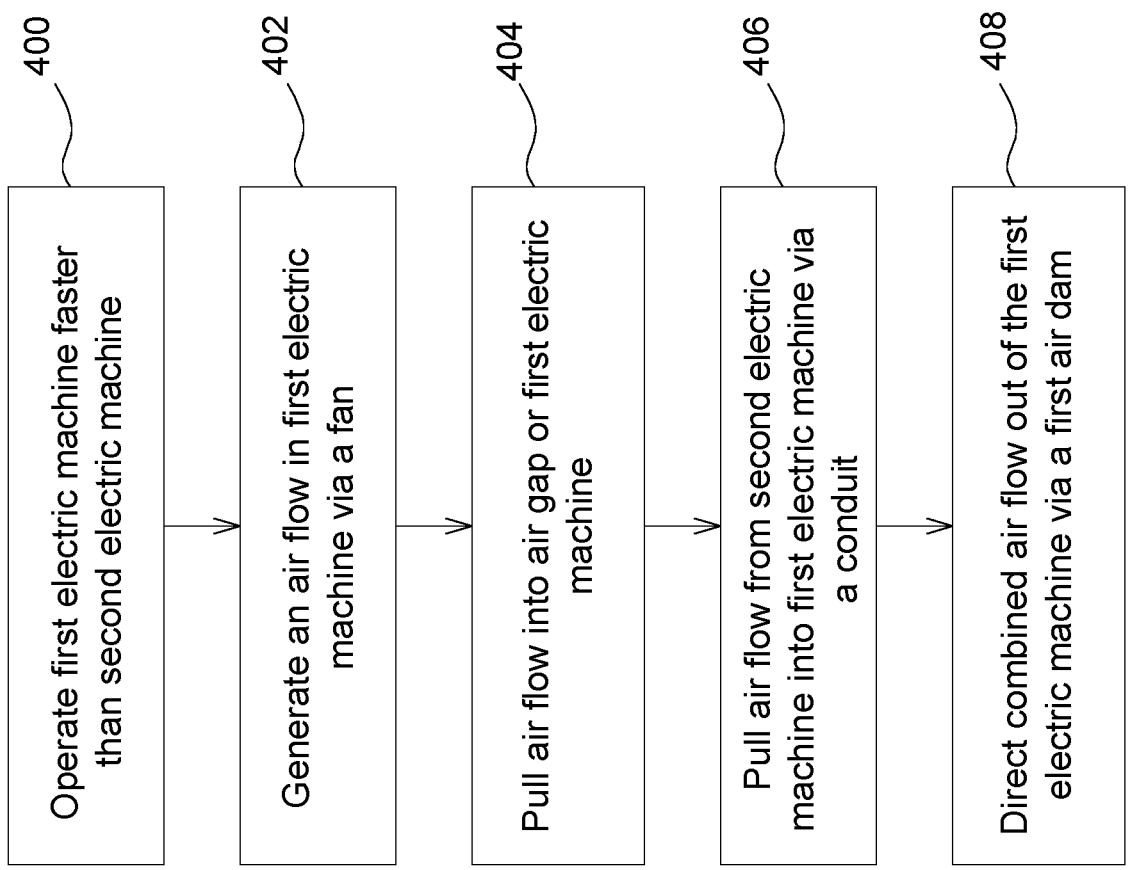
FIG. 15 is a flow diagram for a method of cooling a plurality of electric machines, according to an implementation.

With reference to FIG. 15, a method for cooling a first electric machine 120A and a second electric machine 120B can include one or more of the following steps. At step 400, the method can include rotating a rotor assembly 130 in the first electric machine 120A at a faster speed than a rotor assembly 130 in the second electric machine 120B. At step 402, the method can include generating an air flow within a housing 122 of the first electric machine 120A by rotating a fan 190 attached to the rotor assembly 130. At step 404, the method can include generating an air flow 210 towards a first air gap 136 positioned between the rotor assembly 130 and a stator assembly 140 of the first electric machine 120A via a rear air dam 170 of the first electric machine 120A positioned at a second end of the housing 122.

At step 406, the method can include generating an air flow 212 into the housing 122 of the first electric machine 120A and an air flow 216 out of the housing 122 of the second electric machine 120B. The fan 190 pulls or draws the air flow 216 out of the second electric machine 120B through the passageway 160 and into the conduit 126. The fan 190 pulls or draws the air flow 212 from the conduit 126 and into the housing 122 of the first electric machine 120A through the passageway 160 of the front air dam 150.

At step 408, the method can include directing the combined air flows 210, 212 out of the first electric machine 120A through the opening 156 in the front air dam 150. When the second electric machine 120B is rotating faster than the first electric machine 120A, then the air flow in the conduit 126 is reversed and flows out of the first electric machine 120A to the second electric machine 120B. In other implementations, one or more of these steps, processes, or operations may be omitted, repeated, re-ordered, combined, or separated and still achieve the desired results.

Figure 16:
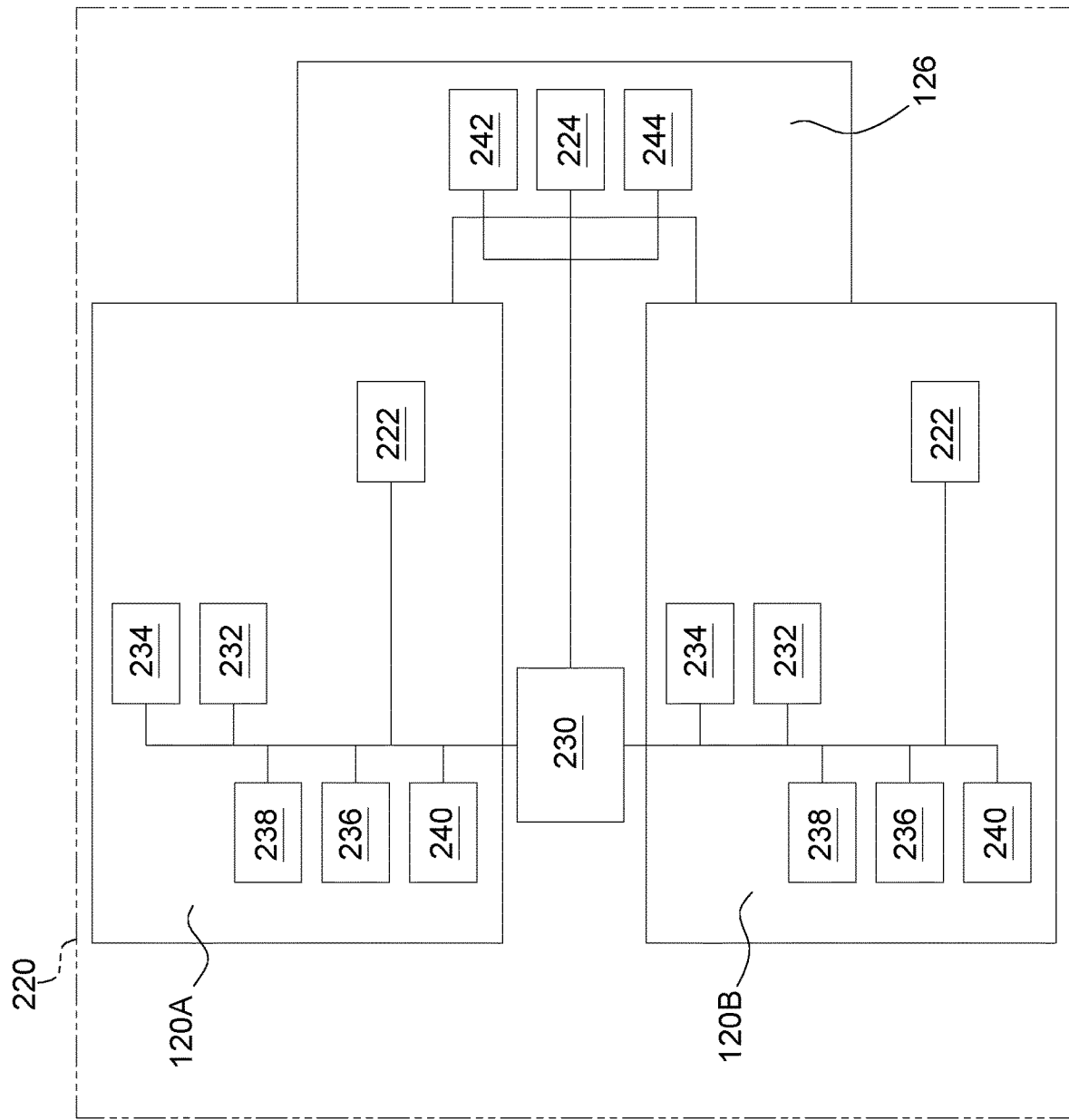
FIG. 16 is a schematic diagram of a cooling system or arrangement, according to an implementation.

With reference to FIG. 16, the cooling system or arrangement 220 includes an electronic control unit 230, or controller, having one or more microprocessor-based electronic control units or controllers, which perform calculations and comparisons and execute instructions. The controller 230 includes a processor, a core, volatile and non-volatile memory, digital and analog inputs, and digital and analog outputs. The controller 230 can include non-transitory, computer readable memory, such as random-access memory (RAM), read only memory (ROM), or electrically erasable programmable read only memory (EEPROM), which include instructions for execution by the processor. The controller 230 connects to and communicates with various input and output devices including, but not limited to, switches, relays, solenoids, actuators, light emitting diodes (LED's), passive and interactive displays, radio frequency devices (RFD's), sensors, and other controllers. The controller 230 receives communications or signals, via electrically or any suitable electromagnetic communication, from one or more devices, determines an appropriate response or action, and sends communications or signals to one or more devices. The controller 230 can be a microprocessor, an application specific integrated circuit (ASIC), a digital processor, or a programmable logic controller, also known as a PLC or programmable controller. The controller 230 can connect to and communicate with one or more of the work vehicles 100 electronic control system and the transmission 112 electronic control system through a data bus, such as a CAN bus, or the controller 230 can be a part of one or more of the work vehicle 100 electronic control systems and the transmission 112 electronic control system.

According to some implementations, the electric machine 120 can include a valve 222 to direct the air flow from the fan 190 in different directions within the front air dam 150. The valve 222 can direct all the air flow from the fan 190 to the air gap 136, to the passageway 160 of the front air dam 150, or to the opening 156 in the front air dam 150. The valve 222 can vary the proportion of the air flow between the air gap 136 and the passageway 160. The valve 222 can be positioned near or in the passageway 160. The valve 222 can open the passageway 160 to allow at least some of the air flow to exit or enter through the passageway 160. The valve 222 can close the passageway 160 to prevent the air flow from exiting or entering through the passageway 160. The valve 222 can partially open the passageway 160 to allow a proportional amount of air flow to exit or enter through the passageway 160 based in part upon the position of the valve 222. The valve 222 can be mechanical or electronic.

The controller 230 can determine the position of the valve 222 to direct the air flow based in part upon one or more of the following: a speed of the fan 190 via a speed sensor 232, a pressure within the front air dam 150 via a pressure sensor 234, a temperature of the stator assembly 140 via a temperature sensor 236, a temperature of the rotor assembly 130 via a temperature sensor 238, a temperature of the housing 122 via a temperature sensor 240, a pressure within the conduit 126 via a pressure sensor 242, and a temperature of the conduit 126 via temperature sensor 244, or any combination of these sensors or other variables. The controller 230 can determine the position of the valve 222 to direct the air flow to a component with a temperature above a threshold or to a component with the highest temperature.

Alternatively, or additionally, the conduit 126 can include a valve 224 with multiple positions. In a first position, the valve 224 can allow air flow from the first electric machine 120A to the second electric machine 120B. In a second position, the valve 224 can allow air flow from the second electric machine to the first electric machine. In a third position, the valve 224 can allow air flow in either direction. In a fourth position, the valve 224 can prevent flow in either direction. The valve 224 can partially open the conduit 126 to allow a proportional amount of air flow to exit or enter through the passageway 160 based in part upon the position of the valve 224. The valve 224 can be mechanical or electronic.

The controller 230 can select the position of the valve 224 based in part upon one or more of the following: a speed of the fan 190 via a speed sensor 232, a pressure within the front air dam 150 via a pressure sensor 234, a temperature of the stator assembly 140 via a temperature sensor 236, a temperature of the rotor assembly 130 via a temperature sensor 238, a temperature of the housing 122 via a temperature sensor 240, a pressure within the conduit 126 via a pressure sensor 242, and a temperature of the conduit 126 via temperature sensor 244, or any combination of these sensors or other variables. The controller 230 can determine the position of the valve 224 to direct the air flow to a component with a temperature above a threshold or to a component with the highest temperature.

Without in any way limiting the scope, interpretation, or application of the claims appearing below, a technical effect of one or more of the example implementations disclosed herein is an electric machine having a fan, which can produce an air flow to cool the electric machine. An air dam directs the air flow towards or away from the fan. A conduit can connect the passageway of an air dam in a first electric machine to the passageway of an air dam in a second electric machine. The relative speeds of the fans, the rotation direction of the fans, and the type of fans determine the direction of the air flow in the conduit between the first and second electric machines. The one or more of the example implementations disclosed can be used with any type of electric machine.

The terminology used herein is for describing particular implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof. One or more of the steps or operations in any of the methods, processes, arrangements, or systems discussed herein may be omitted, repeated, re-ordered, combined, or separated and are within the scope of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. An electric machine for a work vehicle, comprising:
a housing;
a stator assembly positioned inside the housing;
a rotor assembly rotatably connected to the housing via a bearing, the rotor assembly positioned to form an air gap between the stator assembly and the rotor assembly;
a front air dam positioned at a first end of the housing and adjacent to the air gap, the front air dam including an external barrier, an internal barrier, an opening in the internal barrier, and a passageway in the internal barrier; and
a fan attached to the rotor assembly and positioned within the housing, the fan generating a first air flow towards the air gap and a second air flow through the passageway;
wherein when the rotor assembly rotates, the fan generates a third air flow into the housing through the opening in the front air dam, which directs the first air flow from the fan towards the air gap and directs the second air flow from the fan through the passageway and out of the housing.

2. The electric machine of claim 1, wherein the external barrier and the internal barrier of the front air dam form an interior, and the fan is positioned within the interior.

3. The electric machine of claim 1, wherein the opening in the front air dam is positioned within a middle portion of the internal barrier of the front air dam, and the passageway of the front air dam is positioned between the opening in the front air dam and the external barrier of the front air dam.

4. The electric machine of claim 1, further comprising a front shield including an opening arranged coaxially with the opening of the front air dam.

5. The electric machine of claim 1, further comprising a rear air dam positioned at a second end of the housing, the rear air dam including an opening, and the rear air dam being adjacent to the air gap.

6. The electric machine of claim 5, further comprising a rear shield including an opening arranged coaxially with the opening of the rear air dam.

7. The electric machine of claim 1, further comprising a valve selectively directing the second air flow within the front air dam.

* * * * *